3,737,295
Patented June 5, 1973

3,737,295
PROCESS FOR PRODUCING A
RIBBON-LIKE GLASS
Hideo Mitsuno, Maizuru-shi, Japan, assignor to Nippon
 Sheet Glass Co., Ltd., Osaka, Japan
Filed Nov. 20, 1970, Ser. No. 91,325
Claims priority, application Japan, Nov. 24, 1969,
44/94,535
Int. Cl. C03b 18/02
U.S. Cl. 65—99 A                4 Claims

ABSTRACT OF THE DISCLOSURE

A process for producing a glass ribbon having a thickness smaller than the equilibrium thickness which comprises feeding molten glass onto a molten metal bath, gradually cooling the resulting glass ribbon while advancing it over the molten metal bath, withdrawing the solidified glass ribbon from the molten metal bath, and advancing it through a lehr. The invention further comprises the steps of applying a pulling force to the ribbon-like layer of molten glass formed on the molten metal bath from outside the molten metal bath thereby to reduced the thickness and width of the glass ribbon layer continuously in a deformable area of the glass ribbon, providing a guide member on the molten metal bath for contacting one side edge of the glass ribbon layer to control the advancing direction of the glass ribbon, and providing a weir in that area of the molten metal bath on which the glass ribbon is not present and which is in proximity to the guide member to obstruct the convection of the molten metal bath in a direction parallel to the advancing direcion of the glass ribbon.

---

This invention relates to a process for producing a ribbon-like glass using a molten metal bath, and more particularly, to a process especially suited for the production of a uniform ribbon-like glass having a thickness smaller than the equilibrium thickness.

A method of producing a ribbon-like glass has heretofore been known which comprises feeding molten glass at a controlled rate onto a molten metal bath contained in a tank to form a ribbon-like layer of molten glass on the molten metal bath, gradually cooling the layer of glass ribbon while it is advancing over the molten metal bath, until it is solidified to an extent sufficient to withdraw the solidified glass ribbon from the molten metal bath without causing injury, continuously withdrawing the solidified glass ribbon from the molten metal bath, advancing it through a lehr, and thereafter withdrawing it from the lehr.

In the prior method described, the glass ribbon layer advancing on the molten metal bath undergoes a force in the widthwise direction owing to various influences such as thermal convection caused by the temperature gradient of the molten metal bath or an imbalance of the component force in the widthwise direction (the direction at right angles to the advancing direction of the glass ribbon) of the pulling force exerted on the glass ribbon layer. Thus, the glass deviates from a predetermined path, and tends towards one side of the molten metal bath or advances in a zigzag fashion. This undesirable phenomenon tends to occur especially when an increased pulling force is exerted on the layer of glass ribbon advancing over the molten metal bath. When such a phenomenon occurs, various disadvantages are caused. For instance, the layer of glass ribbon contacts the inner wall of the tank for the molten metal bath and adheres to it, in which case the production of glass plate become impossible, or proper annealing of the ribbon-like glass layer in the lehr becomes difficult. Or when the solidified glass ribbon is continuously cut in an automatic manner, changes occur in the position of the side edge of the glass ribbon, and therefore it is necessary to use a cutting device of complicated structure which moves in response to such changes. Furthermore, since the pulling force to be exerted on the glass ribbon layer changes owing to the zigzag movement of the glass ribbon layer on the molten metal bath, the thickness of the glass ribbon layer fluctuates.

The prior methods of preventing the aforementioned phenomenon consist in localized heating or cooling of the molten metal bath to control the thermal convection of the molten metal bath, or in the provision of a pair of guide members along both sides of an elongated glass layer on the molten metal bath for defining of a path for the glass ribbon. In the former method, the convection of the molten metal is controlled by temperature control, and therefore, such operation is difficult. Furthermore, this method is not sufficient to control the advancing direction of the glass ribbon layer. On the other hand, the latter method has the disadvantage that if the width of the glass ribbon becomes larger upstream of the pair of guide members due to the fluctuation of feed rate for instance, there will be an increasing frictional resistance by contact of the glass ribbon with the guide members, and the thickness of the glass ribbon fluctuates because of the pulling force exerted on the glass ribbon layer. Consequently, it has been impossible for the prior methods to control the advancing direction of glass ribbon effectively.

The object of the present invention is to provide a method of controlling the advancing direction of a layer of glass ribbon advancing on a bath of molten metal with ease and accuracy.

According to the invention, there is provided a process for producing a glass ribbon which comprises the steps of feeding molten glass at a controlled rate onto a molten metal bath contained in a tank to form a ribbon-like layer of molten glass on the molten metal bath, gradually cooling the glass ribbon while it is advancing over the molten metal bath to change the molten glass to a solid state, withdrawing the solidified glass ribbon continuously from the molten metal bath, and advancing the glass ribbon through a lehr. A pulling force is applied to the ribbon-like layer of molten glass formed on the molten metal bath from outside the molten metal tank thereby to reduce the thickness and width of the glass ribbon layer continuously in a deformable area of the glass ribbon. In addition, a guide member is provided on the molten metal bath within the deformable area or at a position downstream thereof where the glass ribbon is liable to swing for contacting one side edge of the glass ribbon layer, and a weir is provided on the side of said guide member in that area of the molten metal bath on which the glass ribbon is not present and which is in proximity of the guide member to obstruct the convection of the molten metal bath in a direction parallel to the advancing direction of the glass ribbon.

The invention will be described in greater detail with reference to the accompanying drawings in which.

Figure 2:
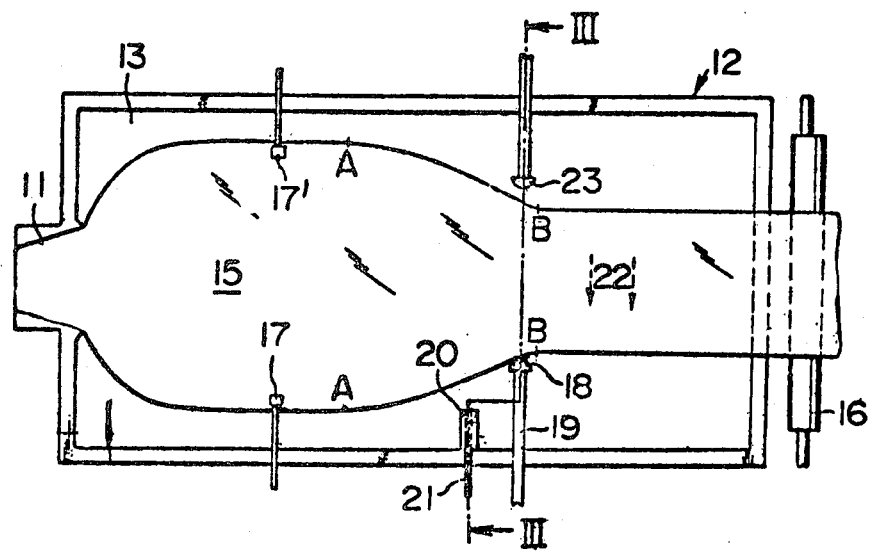
FIG. 2 is a plan, taken along the line II—II of FIG. 1, of a tank containing the molten metal bath.

As illustrated in FIG. 2, a layer of glass ribbon formed on a molten metal bath is normally reduced considerably in thickness when a pulling force is applied to it from outside the molten metal bath tank while advancing on the molten metal bath. At the same time, its width begins to be reduced at a point (A) on the molten metal bath, and the reduction in width is completed substantially at another point (B) downstream of point (A). No substantial reduction in width is seen downstream thereof. In the present specification and claims, an area between the point (shown by A in FIG. 2) of the starting of width reduction and the point (shown by B in FIG. 2) of completion of width reduction is termed a deformable area of the glass ribbon. These points (A) and (B) on the glass ribbon are substantially determined according to predetermined conditions for producing a glass ribbon, such as the method of cooling the glass ribbon on the molten metal bath, the temperature distribution of the molten metal bath, the pulling speed of the glass ribbon, and the feed rate of the molten glass. Accordingly, the deformable area of the glass ribbon is substantially predetermined depending upon the glass producing conditions. In the production of glass ribbon, this deformable area and an area downstream thereof are the places where the zigzag movement of glass ribbon is most likely to occur.

Figure 4:
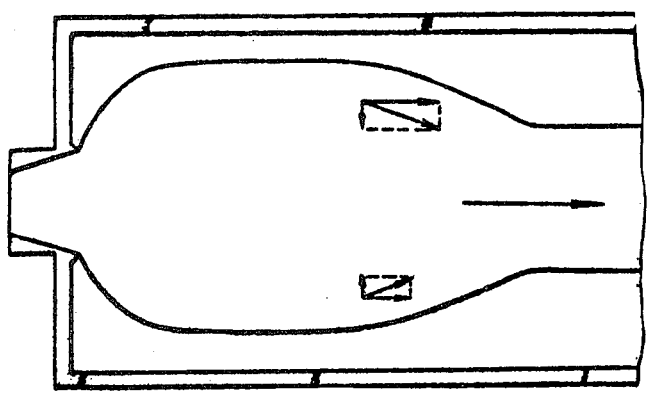
FIG. 4 is a schematic view showing a state where the component force in the widthwise direction of a pulling force to be applied to the glass layer in a deformable area of the glass ribbon is unbalanced.

The most essential feature of the process of the present invention is that a guide member which does not adhere to the molten, tacky glass ribbon is provided in the molten metal bath at any desired position in the deformable area or an area downstream thereof the glass ribbon layer so as to come into contact with one side edge of the glass ribbon. In addition, a weir lying in a direction almost at right angles to the advancing direction of the glass ribbon layer is provided on the side of the guide member in that area of the molten metal bath on which the glass ribbon layer is not present and which is in proximity to the guide member. This location is preferably in an area covering three feet upstream of the guide member and the convection of the molten metal bath in a direction parallel to the advancing direction of the glass ribbon layer is thus obstructed by the weir. In the production of glass ribbon, a temperature gradient is usually provided in the molten metal bath along the advancing direction of the glass ribbon by suitable heating and cooling means, whereby the glass ribbon layer is gradually cooled from a molten state to a solid state. When such a temperature gradient is present in the molten metal bath, thermal convection occurs from the high temperature side to the low temperature side in an area near the surface of the molten metal bath, and in a reverse direction in an area near the bottom of the molten metal bath. The provision of the weir described above considerably reduces the tendency of the temperature of the molten metal bath to become uniform as the low temperature molten metal present downstream of this weir is prevented from being exchanged by convection with the high temperature molten metal upstream of this weir. As a result, the temperature of the molten metal present on the side with the weir and upstream thereof is 20° to 40° C. higher than in the case where a weir is not provided. On the other hand, in the molten metal bath on the side without the weir, the thermal convection is not effected, and therefore, there is hardly any change in the temperature distribution of the molten metal bath from the case where a weir is not provided. The temperature of the molten metal on the side with the weir is therefore about 20°–40° C. higher than that of the molten metal on the side without the weir. The temperature of the glass ribbon in intimate contact with the molten metal on the side, without the weir is lower by about 20°–40° C. than on the side with the weir. Therefore, the tackiness or viscosity of the glass ribbon layer on the side without the weir becomes larger than that on the side with the weir. As a result, the internal stress induced with the result that internal stress induced in the glass ribbon layer by the pulling force to be applied to the glass ribbon layer from outside the tank molten metal bath is considerably larger on the side without the weir than on the side with the weir. When the internal stress induced on both sides of the glass ribbon layer is separated into a component force in the direction parallel to the advancing direction of the glass ribbon and a component force in the direction at right angles thereto, it is observed that the component force in the direction at right angles (namely, the component force in the widthwise direction of the glass ribbon layer) is larger on the side without the weir than on the side with the weir. The difference in the component force acts on the glass ribbon layer to urge the glass ribbon layer against the guide member. The occurrence of such unbalanced component forces is shown in FIG. 4.

On the other hand, as regards the temperature of the downstream of the weir, the temperature of the molten metal on the side without the weir is higher than that of the molten metal on the side with the weir because the presence of the weir obstructs the convection of the molten metal only on the side with the weir. Thus, the thermal convection of the molten metal occurs from the side without the weir towards the side of the weir near the surface of the molten metal bath, and by the action of this convection, the ribbon-like glass is again urged against the guide member. As described above, according to the process of the present invention in which the guide member and the weir in proximity thereto are provided, the glass ribbon layer is always subjected to an action which urges it against the guide member, and therefore the ribbon advances while one edge is always in contact with the guide member. This completely obviates the zigzag movement of the glass ribbon.

The guide member used in the process of the invention is preferably provided either at the downstream side of the deformable area or in an area ranging from the point (B) where the width reduction ends to a point downstream of point (B). It is especially preferred that the guide member be positioned at either side of the point (B) at a distance from the point (B) equal to ⅓ or less of the length of the deformable area. According to the process of the present invention, the force urging the glass ribbon layer against the guide member can be varied by changing the length of the weir and its depth in the molten metal bath. By increasing the length of the weir and its depth immersed in the bath, it is possible to firmly urge the glass ribbon layer against the guide member.

The guide member used in the present invention may be made of a material, such as graphite, which does not stick low viscosity glass and which therefore provides a slippery surface. The weir may be made of a material, such as graphite, which is thermally stable and on which the molten metal will not accumulate.

If desired, a restriction member of a structure similar to the guide member may be provided on the opposite side to the side with the guide member in spaced-apart relationship with the side edge of the glass ribbon. The side edge of the glass ribbon does not come into contact with the restriction member so provided when the glass ribbon is advanced over a predetermined path. Even when some abnormal accident happens and the glass ribbon moves in a zigzag fashion, the restriction member serves to prevent the side edge of the glass ribbon from contacting the inner wall of the tank containing molten metal and then adhering to it.

According,ly the advancing direction of a glass ribbon can be controlled easily and accurately by using an apparatus of simple structure. The ribbon-like glass layer does not come into contact with the inner surface of the tank containing the molten metal bath, and the glass ribbon can be withdrawn from the molten metal bath to a predetermined position. At the same time, the temperature control of a lehr in the subsequent annealing step and the cutting of the glass in the cutting step become easy.

The process of the invention will be described with reference to an embodiment in which the apparatus shown in the drawings is employed.

Figure 1:
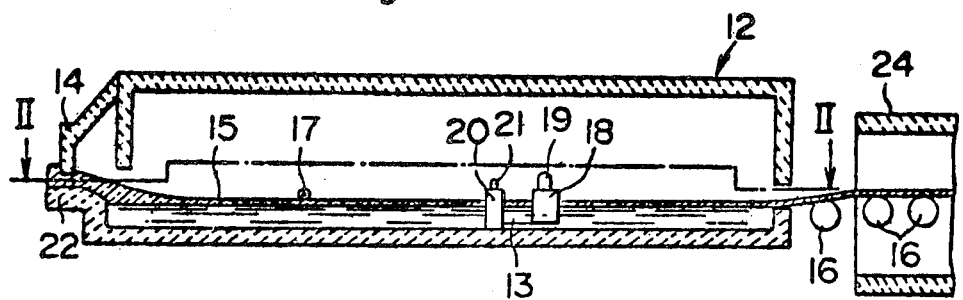
FIG. 1 is a vertical sectional view of one embodiment of an apparatus for practicing the process of the invention.
Figure 3:
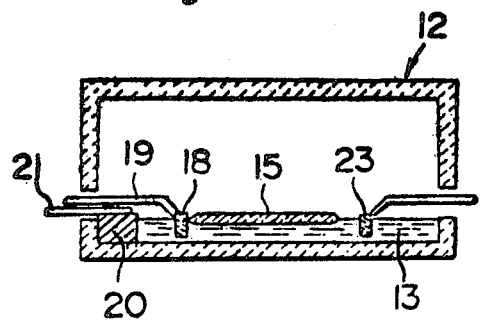
FIG. 3 is a front elevation of the apparatus taken along the line III—III of FIG. 2.

Referring to FIGS. 1 to 3, glass melted in a glass melting furnace (not shown) passes a path 11, and by means of a damper 14 is fed at a controlled rate onto a molten metal bath 13 contained in a tank 12 whereby a layer of glass ribbon 15 is formed. A temperature gradient is provided in the molten metal bath along its length by heating and cooling means (not shown). The glass ribbon layer 15 is pulled by a conveyor roll 16 which advances the ribbon over the molten metal bath and simultaneously stretches it to predetermined thickness. Also, while it is advancing, it is gradually cooled and solidified. The solidified glass ribbon is withdrawn from the molten metal bath tank 12, and transferred to a lehr 24 where it is annealed. In a normal operation using a bath of molten tin, the thickness of the glass ribbon produced without applying an external force thereto is 6.8 mm. (equilibrium thickness). In order to produce a ribbon-like glass having a smaller thickness, both side edges of the glass ribbon layer 15 spread on the molten bath in a thickness of 6.8 mm. are held by a pair of rotary rolls 17 and 17′, and the glass ribbon is pulled by the conveyor roll 16.

The glass ribbon layer 15 at an area upstream of the rotary rolls 17 and 17′ on the molten metal bath 13 does not undergo the influence of the pulling by the conveyor roll 16. But when the glass ribbon layer 15 advances over the molten metal bath 13 past rolls 17 and 17′ thickness reduction and width reduction of the glass ribbon begin at point (A) illustrated in FIG. 2. This reduction in thickness and width of the glass ribbon layer 15 substantially finishes at point (B) shown in FIG. 2.

In the embodiment shown in FIG. 2, a guide member 18 of semi-cylindrical shape made of graphite is provided in contact with one edge of the glass ribbon layer 15. This guide member 18 is held by a supporting member 19 at a point near point (B). About 30 cm. upstream of the guide member 18, a weir 20 of graphite is held by a supporting member 21 and is immersed in the molten metal bath until it reaches the bottom of the tank 12, whereby the flow of the molten metal bath 13 is shut off. By shutting off the flow of molten metal with the weir 20, the temperature of the molten metal upstream on weir 20 rises by about 20° C., the side of the glass ribbon layer 15 on that side becomes higher. Therefore, the internal stress of the glass ribbon at this portion is smaller than that exerted on the opposite side portion, and the component force thereof in the widthwise direction of the glass ribbon layer 15 is also smaller. The temperature of the molten metal bath 13 downstream of the weir 20 is lower on the side with the weir 20 than on the side without the weir 20. The thermal convection proceeds in the direction of an arrow 22. Hence, the glass ribbon layer 15 advances over a predetermined path always being urged against the guide member 18. The zigzag movement of the glass ribbon layer 15 can be prevented by providing a restricting member 23 having similar structure opposite to the guide member 18 and in spaced-apart relationship with the side edge of the glass ribbon layer 15.

In the embodiment just described of the present invention, the weir 20 is provided in the molten metal bath at a position upstream of the guide member 18. It may however be provided downstream in proximity to the guide member 18. Or it may be provided with equal results at a position side by side with the guide member 18 by securing it to the supporting member 19 of the guide member 18.

I claim:
1. A process for producing a glass ribbon which comprises the steps of feeding molten glass at a controlled rate onto a molten metal bath contained in a tank to form a ribbon-like layer of molten glass on the molten metal bath, gradually cooling the glass ribbon while it is advancing over the molten metal bath to change the molten glass to a solid state, withdrawing the solidified glass ribbon continuously from the molten metal bath, and advancing the glass ribbon through a lehr, applying a pulling force to the ribbon-like layer of molten glass formed on the molten metal bath from outside the tank for the molten metal bath thereby to reduce the thickness and width of the glass ribbon layer continuously in a deformable area of the glass ribbon, providing a guide member on the molten metal bath only on one side of said ribbon within the deformable area or at a position downstream thereof where the glass ribbon is liable to swing, contacting one side edge of the glass ribbon layer with the guide member, providing a weir on the same side of said ribbon as said guide member in that area of the molten metal bath on which the glass ribbon is not present and which is in proximity to the guide member and using said weir to obstruct the convection of the molten metal bath in a direction parallel to the advancing direction of the glass ribbon.

2. A process according to claim 1 wherein the guide member is positioned either upstream or downstream of the point where the width reduction of the ribbon ends, and is spaced therefrom a distance ⅓ or less of the length of the deformable area.

3. A process according to claim 1 wherein said weir is provided upstream of said guide member.

4. A process according to claim 1 wherein a restriction member is provided in the molten metal bath on the side opposite to the side of the guide member in spaced-apart relation with the side edge of the glass ribbon.

References Cited

UNITED STATES PATENTS

| 3,520,672 | 7/1970 | Greenler et al. | 65—91 |
| 3,622,300 | 11/1971 | Javaux | 65—99 A |
| 3,479,171 | 11/1969 | Robinson et al. | 65—99 A |
| 3,528,795 | 9/1970 | Swillinget | 65—99 A |

S. LEON BASHORE, Primary Examiner

K. M. SCHOR, Assistant Examiner

U.S. Cl. X.R.

65—91